(No Model.)
J. BODINE.
SEWER TRAP.
No. 287,413.  Patented Oct. 30, 1883.
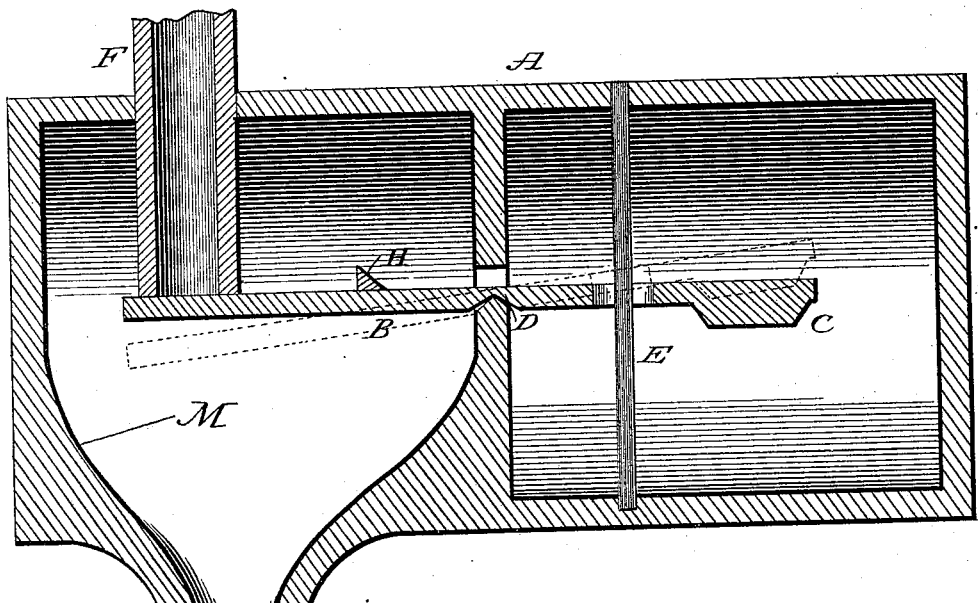
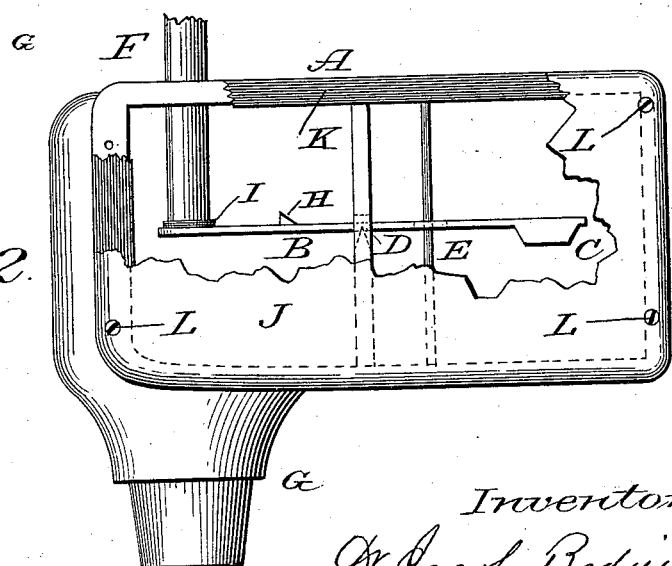
Witnesses:
Edward Ziegler
F. H. Lyon
Inventor:
Dr. Jacob Bodine

United States Patent Office.

JACOB BODINE, OF JERSEY CITY, NEW JERSEY.

SEWER-TRAP.

SPECIFICATION forming part of Letters Patent No. 287,413, dated October 30, 1883.

Application filed March 8, 1883. (No model.)

*To all whom it may concern:*

Be it known that I, JACOB BODINE, a citizen of the United States, residing at Jersey City, in the county of Hudson, in the State of New Jersey, have invented certain new and useful Improvements in Sewer-Traps, of which the following is a full, clear, and exact description, reference being had to the accompanying drawings, illustrating the same and forming part hereof.

The object of my invention is to simplify and improve means for preventing the ingress of sewer-gas into buildings having sewer or cess-pool connections; and the invention relates to that class of "sewer traps," as they are called, wherein a valve is used to normally seal the waste-pipe of water-fixtures.

The improvements consist in the construction and arrangement of the valve and the casing or shell, as hereinafter specified and claimed.

In the drawings above referred to, in the two figures of which like parts are similarly designated, Figure 1 is a longitudinal vertical section of my trap; and Fig. 2 is a side elevation thereof, with the cover partly broken away.

In practicing my invention I employ a shell or casing, A, of suitable material, which will constitute a receiver, into which leads the waste-pipe F of the water-fixtures of a building.

D is a wall or partition in the trap, having a seat for the valve B, said seat being so arranged relatively to the end of the pipe F as that the valve in closing the pipe will be horizontal. This valve B may be a flat piece of metal, supported by a notch in its under side on an inverted V edge on the wall D, and one end is of a length sufficient to cover the mouth of the pipe F, while the other end overbalances said fore end, so as to keep the valve normally seated against the mouth of the pipe F, to close it. This overbalancing may be accomplished by fixed or movable weights C on the valve. This waste matter descending the pipe F, striking the valve, overbalances its weight and causes it to descend to, say, the dotted-line position, Fig. 1, whence it passes through the trap out of the pipe G, leading to the sewer or drain. The valve returns automatically to close the pipe F so soon as the matter has passed. The valve is guided in its movements and kept from displacement by the rod E, which passes through a slot in said valve and is secured in some part of the trap. The valve has a dam, H, arranged transversely thereof, to prevent swash. Said valve may seat on the pipe F, with a rubber or other soft washer or disk, I, Fig. 2.

Access to the interior of my trap may be had through a removable side or other portion. I have shown the side J removable, and attached to the shell A by screws L, with packing K interposed between the shell and side to make a tight joint. This side, J, may be transparent, if desirable.

The shell or casing may have a lining of enamel, or may be interiorly galvanized, as indicated by the heavy black lines M.

It will be noticed that I interpose my trap in the waste-pipe at about a right angle, dividing the waste-pipe and interposing the self-acting valve in the path of the escaping matter, which valve immediately closes the instant matter ceases issuing from the pipe F and before it can have entirely escaped through the outlet G, thus insuring the certainty of sealing the waste-pipe against the inflow into the building of foul gases or odors. The valve being wholly inclosed within the trap no escape by it is possible.

The trap will be made in sizes and shapes and of materials suited to the purposes for which it will be used, and will be supported in position as its surroundings demand.

The valve being seated loosely is not confined by a joint or pivot liable, through rust or corrosion, to impair its freedom of motion, and hence there is little danger of the valve failing to close the waste-pipe through sticking to its seat or fulcrum.

What I claim is—

1. The combination of the shell, the inlet thereto, a partition, an automatic valve loosely supported in said partition and normally closing the inlet, and a guide for said valve, substantially as shown and described.

2. The combination of the shell A, inlet F, outlet G, and an automatic valve supported loosely in said shell and provided with a dam, substantially as shown and described.

3. The combination of the shell A, inlet F, outlet G, partition D, automatic valve B, guide E, and packed cover J, substantially as shown and described.

Witnesses:     JACOB BODINE. [L. S.]
    MARY B. THURSTON,
    SAMUEL W. GARRISON.